United States Patent [19]

Gdovin et al.

[11] 4,310,974

[45] Jan. 19, 1982

[54] SIMULATED LIGHTS FOR AN AIRFIELD MODEL

[75] Inventors: David P. Gdovin, Vestal; Frank J. Lusk, Binghamton, both of N.Y.

[73] Assignee: The Singer Company, Binghamton, N.Y.

[21] Appl. No.: 665,939

[22] Filed: Mar. 11, 1976

[51] Int. Cl.³ .............................................. G09B 9/08
[52] U.S. Cl. .......................................... 434/42; 40/547; 350/96.24
[58] Field of Search ............... 35/10.2, 11, 12 N; 29/447, 464, 469, 592; 40/28 C, 52 R, 130 D, 130 L, 130 K; 240/1 R, 1 EL, 1 LP, 1.2, 2.1, 10.2; 340/379, 380; 350/96 R, 96 B, 96 C

[56] References Cited

U.S. PATENT DOCUMENTS

| | | | |
|---|---|---|---|
| 3,623,240 | 11/1971 | Wood | 35/12 N |
| 3,768,146 | 10/1973 | Braun et al. | 350/96 C X |
| 3,792,284 | 2/1974 | Kaelin | 250/551 |
| 3,846,010 | 11/1974 | Love et al. | 350/96 C X |
| 3,871,743 | 3/1975 | Fulenwider | 350/96 C X |
| 3,903,615 | 9/1975 | Dotsko | 35/12 N |
| 3,922,063 | 11/1975 | Marrone | 350/96 C |
| 3,962,702 | 6/1976 | Kriege | 350/96 C X |

Primary Examiner—Vance Y. Hum
Attorney, Agent, or Firm—Jeff Rothenberg; Stephen C. Kaufman

[57] ABSTRACT

A light at an aircraft landing site is simulated on a model board by the protruding output end of a precision cut optical fiber. The fiber is secured within a counterbore of a counterbored hole in the model board. The length of the precision cut fiber and the depth of the counterbore are closely controlled to ensure that the output end of the fiber protrudes a desired distance. The input end of the precision cut fiber is optically coupled to a collimated light source by a second optical fiber extending through the smaller diameter bore of the counterbored hole.

32 Claims, 6 Drawing Figures

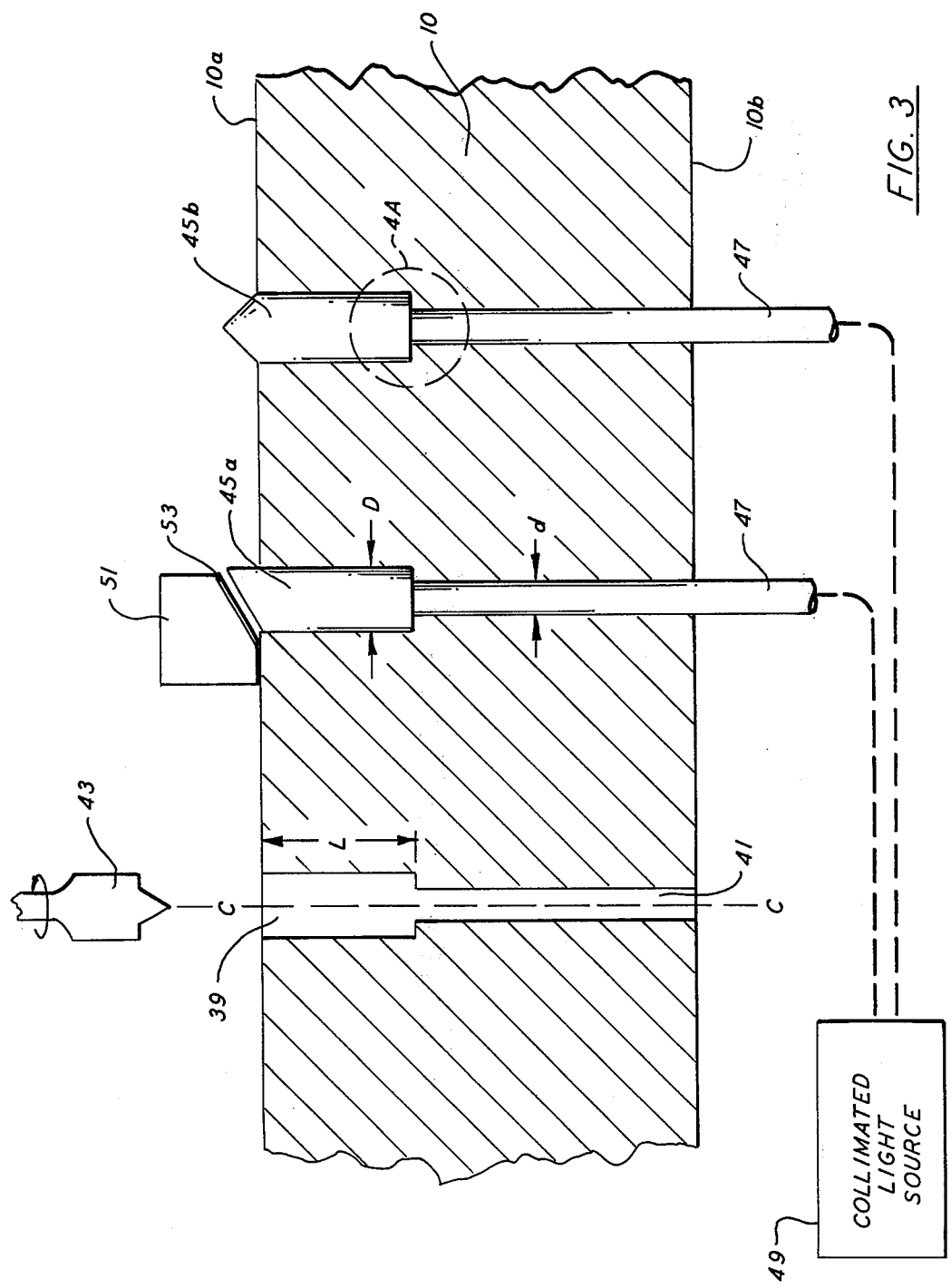

SIMULATED LIGHTS FOR AN AIRFIELD MODEL

The invention described herein was made in the performance of work under NASA Contract Number NAS9-14497 and is subject to the provisions of Section 305 of the National Aeronautics and Space Act of 1958 (72 Stat. 435; 42 U.S.C. 2457).

BACKGROUND OF THE INVENTION

1. Field of the Invention

This invention generally relates to visual systems for flight simulators, and more particularly, to construction of simulated lights on a model board of a camera-model visual display system used with such simulators.

2. State of the Art

One type of visual display system which has gained widespread usage with flight simulators comprises a closed-circuit television system in which a television camera is moved relative to a reduced scale terrain model as the trainee-pilot "flies" the simulated aircraft. The TV camera conveys an image of that portion of the model it is presently viewing to display units surrounding the simulator cockpit.

Models used in such systems are created with painstaking detail to realistically duplicate the landscape visible from an actual aircraft. Often these models include miniature reproductions of airfields or other aircraft landing sites.

To maximize training capability, such models must be useful not only for simulated daylight of flight, but also simulated nighttime operations. In order to realistically simulate nighttime landings, the various lights used at airfields must be simulated on the model.

To simulate airfield lights, the prior art has resorted to small plastic inserts extending through a model board, mirrors mounted on top of the model board and slanted optical fibers. These prior art systems suffer from a number of serious shortcomings including: inadequate brightness along a desired direction, e.g., a simulated glideslope; undesirable variation in color with changes in simulated light intensity; unrealistic appearance; scale discrepancies; and fabrication difficulties.

A model lighting system which overcomes the above enumerated problems is disclosed in a commonly assigned application, Ser. No. 397,147 to R. A. Mecklenborg, filed on Sept. 13, 1973 now U.S. Pat. No. 4,065,859. This system employs individual optical fibers extending perpendicularly through a model board to simulate individual, unidirectional, landing lights. The output end of each of these optical fibers is angled, ground and polished to maximize light projection along a simulated glideslope. For successful simulation, each optical fiber must be mounted in a hole in the model board, so that its output end has a precisely controlled angular orientation and protrusion beyond the model board surface.

A suitable system for so mounting optical fibers in a model board, is described in commonly assigned U.S. Pat. No. 3,903,615 to Martin Dotsko. The fiber mounting scheme of the Dotsko patent employs a keying pin attached with heat shrinkable tubing to each optical fiber and an apertured keying plate affixed to the backside of the model board. The keying pin and plate cooperate to limit rotational and axial movement of the fiber.

Although the approach described in the Dotsko patent has been successfully employed to mount optical fibers in holes in a model board, a need exists for a simpler, less expensive and less tedious method for mounting and maintaining the output ends of optical fibers with precisely controlled protrusions and angular orientations.

SUMMARY OF THE INVENTION

The present invention satisfies the need for an easier, simpler and less costly fiber mounting system and, therefore, facilitates construction of a lighted airfield model.

According to the instant invention, an airfield light on a model is simulated by the input end of an individual, precision cut, optical fiber. The optical fiber is cut to a predetermined length and then inserted in the counterbore of a counterbored hole in the model board. This counterbore has a diameter slightly larger than said precision cut fiber, a base which acts as a stop for said fiber, and a depth which ensures that the output end of the inserted fiber extends a desired distance beyond the surface of the model board. The precision cut fiber can be angularly oriented and then secured within the counterbore. The other end of the precision cut fiber is optically coupled to a collimated light source by a second optical fiber removably extending through the smaller diameter cavity of the counterbored hole.

One object of the present invention is to provide an improved optical fiber mounting arrangement which facilitates construction of simulated airfield lights on a model.

Another object of the invention is to provide unique apparatus for producing a realistic view of an aircraft landing site, after dark, in a camera model visual display system.

Still another object is to provide simple and inexpensive scheme for mounting a light conducting member in a hole in a plate or the like, so that the output end of the member has a precise protrusion and angular orientation, without resorting to keying pins and keying subplates.

Yet another object is to provide an improved method for fabricating a model on which lights are simulated by the output ends of optical fibers.

Other objects of the invention will in part be obvious and will in part appear hereinafter.

The invention accordingly comprises the features of construction, combination of elements, and arrangement of parts, which will be exemplified in the construction hereinafter set forth; the scope of the invention will be indicated in the claims.

BRIEF DESCRIPTION OF THE DRAWINGS

For a fuller understanding of the major objects of the invention reference should be had to the following detailed description taken in connection with the accompanying drawings, in which:

FIG. 3 is a cross-sectional elevation view of a model board having simulated lights constructed according to the present invention.

DETAILED DESCRIPTION

Figure 1:
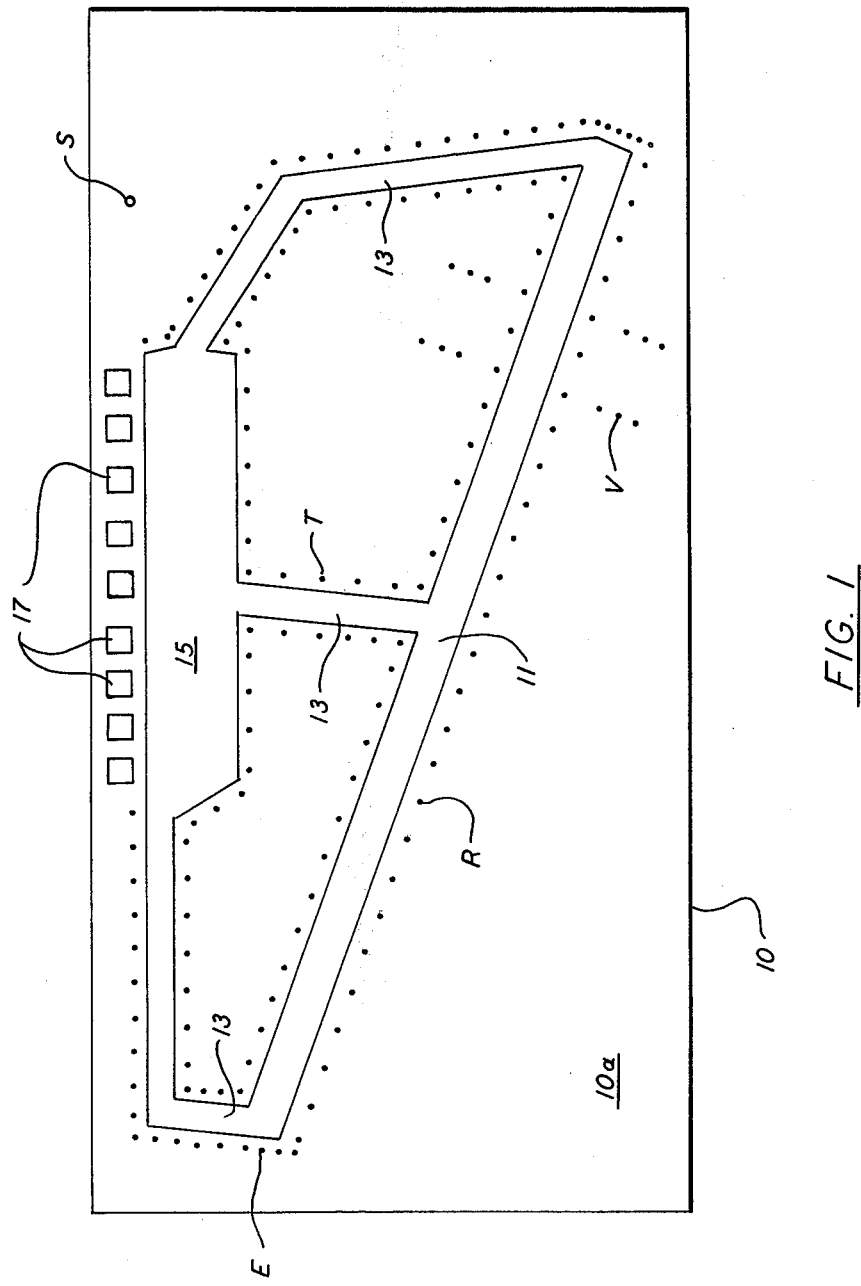
FIG. 1 is a plan view of an airfield model.

The terrain model used in a camera-model visual system of a flight simulator often contains an airfield model such as that illustrated in FIG. 1. The airfield model is constructed on a board or plate 10 which typically comprises a flt aluminum plate, on the order of ⅜ inch thick. The size of the plate naturally varies depending upon the scale selected for the model, but, in a typical application, plate 10 may have a width of 4 feet and a length of 8 feet. Airport plate 10 is generally mounted coplanarly, within a large terrain model board, perhaps 50 feet long by 15 feet wide.

One side of this model board is exposed for viewing by a displaceable television camera (not shown). On the exposed surface 10a of plate 10, a reduced scale model of a typical airfield is constructed. A runway 11, taxiways 13, an aircraft parking area 15, and surrounding fields of grass can be painted on surface 10a. Miniature blocks 17 representing hangars, terminal buildings and other structures, can be secured to surface 10a.

To realistically simulate nighttime operations, the various lights used at airfields must also be simulated on plate 10. The lights which are frequently found at an airfield and which, therefore, must be simulated on a reduced scale airfield model, are generally depicted in FIG. 1. It should be noted that the positioning of the lights on this figure is not meant to depict the actual arrangement of airfield lights to a proper scale, but rather merely to show the different types of lights which commonly are present.

Airfields typically contain runway lights R, taxiway lights T, end of runway lights E, strobe or beacon lights S, and VASI lights V. As is well known, the function, location, color and directionality of these lights differ. Runway lights, for example, are designed to indicate the lateral boundaries of a runway to the pilot of an approaching aircraft and are generally white and unidirectional. Taxiway lights, on the other hand, serve to guide the pilot of a taxiing aircraft and are usually blue and omni-directional.

Prior work has indicated that unidirectional landing lights can be realistically simulated on an airfield model by individual optical fibers extending perpendicularly through the model board. The output ends of these fibers must have a predetermined angular orientation and protrusion beyond the exposed surface of the model board.

Figure 2:
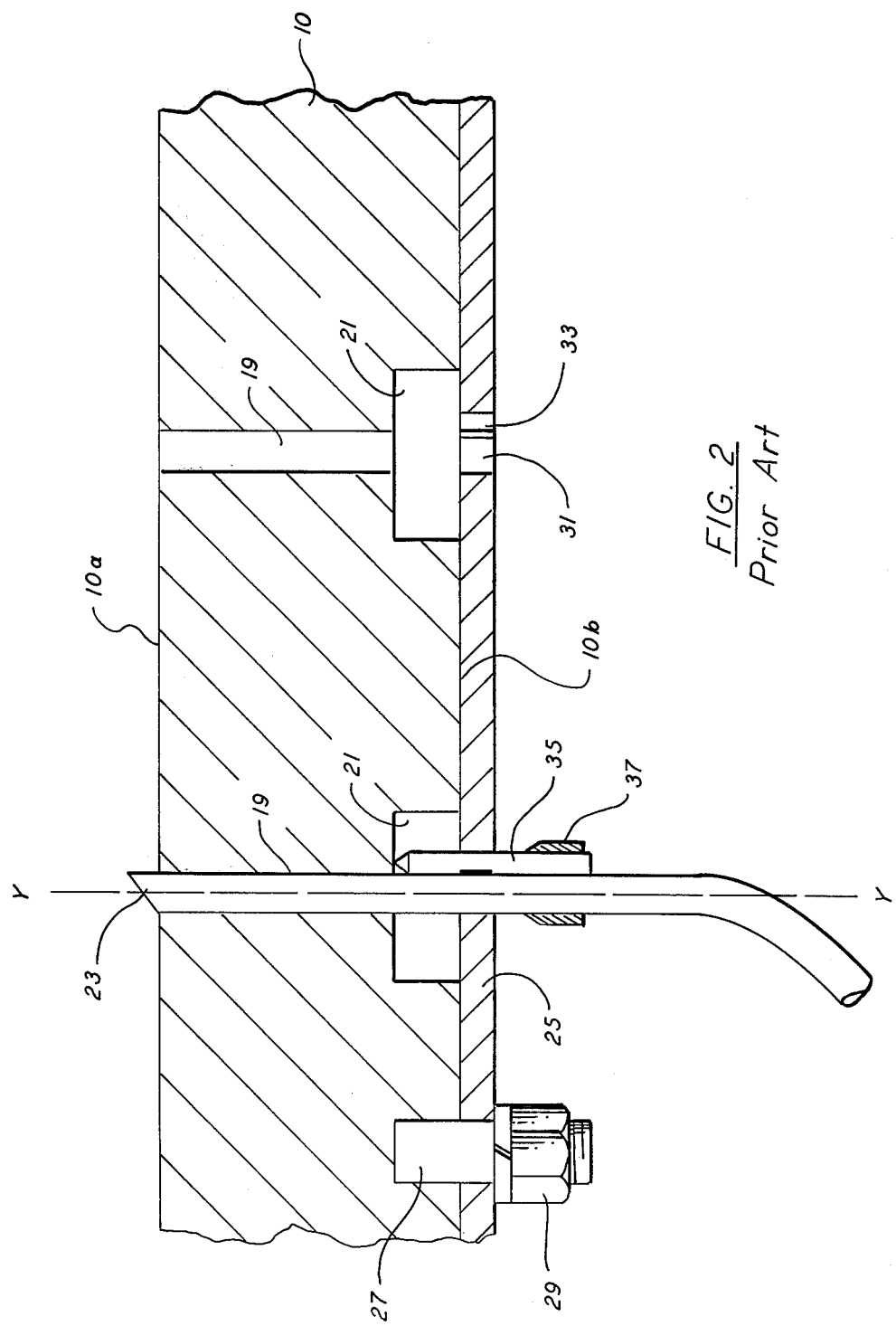
FIG. 2 is a cross-sectional elevation view depicting a prior art method of mounting optical fibers in holes in a model board.

A prior art method for so mounting optical fibers in a model board is shown in FIG. 2. According to this prior art scheme, a plurality of holes 19 are drilled through an airfield plate 10, each hole extending into a recess 21, milled or otherwise provided on the backside 10b of plate 10. A flexible, generally-cylindrical, glass optical fiber 23 is extended through each hole 19. (Hole 19 on the right side of the figure is shown empty as it would be prior to the installation of such a fiber.) The output end of each fiber 23 is ground and polished at a precise angle relative to the longitudinal axis y—y of the fiber to produce total internal reflection and maximum light projection along a desired direction, e.g., a glideslope.

To control the angular orientation and protrusion of the output end of fiber 23, a keying subplate 25 is secured to the backside 10b of the airfield plate, by, for example, a threaded pin 27 and lock nut 29. The keying subplate includes a plurality of paired circular holes 31, 33. Each hole 31 has the same diameter as and registers with a respective hole 19 through airfield plate 10. Adjacent to each hole 31 is a keying hole 33, provided to receive a keying pin 35 affixed to optical fiber 23. Keying pin 35 is secured to fiber 23, with heat strinkable tubing 37, at a predetermined distance and angular orientation relative to the output end of the optical fiber.

Each fiber-key pin assembly is installed in the model board by pushing it through the keying subplate with pin 35 entering hole 33 and fiber 23 passing first through hole 31 in the keying subplate and then through hole 19 in the airfield plate. The motion of the fiber-pin assembly is terminated and the desired positioning of the output end of the fiber is obtained when the upper end of the keying pin strikes the roof of recess 21.

Although the above described prior art scheme has been successfully employed to mount optical fibers in a model board, this success has been tempered by the increase in cost, complexity and assembly time required by said fiber installation method.

Milling of the backside of the airfield plate; precision fabrication of the fiber-keying pin assembly; and manufacturing, aligning and mounting of the keying subplate all add to the complexity and expense of producing airfield models. In addition, due to localized variations in plate thickness and surface irregularities, it has been necessary to prepare fiber-pin assemblies covering a range of fiber end to pin tip separations. To obtain a uniform height of the optical fibers above the model board surface, individual and selective installation of these fiber-pin assemblies in model holes has been required. This procedure is both lengthy and tedious because the fiber-pin assemblies are inserted from the backside of the plate while the protrusion of the output end of the fiber must be measured from the front of the plate. When a fiber pin assembly which provides a proper protrusion has been identified for a particular hole, the fiber and hole must be marked as a matched set. This is necessary to enable reinstallation of the separately shipped fibers in the model board at the final assembly site.

The instant invention overcomes the disadvantages of the prior art scheme. It eliminates the fiber-pin assembly, the keying subplate and the fiber/hole marking requirement, thereby reducing the complexity and cost of fabricating an airfield model. Further it optionalizes the milling operation on the backside of the plate and simplifies and shortens the final fiber installation procedure.

According to the instant invention, the various airfield lights represented in FIG. 1, as well as other lights used at airports and other aircraft landing sites, i.e., heliports, aircraft carrier flight decks, etc., are realistically simulated by the output ends of precision-cut optical fibers secured within counterbores in a model board.

FIG. 3 illustrates the preferred construction of simulated airfield lights on a model board, according to the instant invention. For each simulated light, a cylindrical hole or counterbore 39, of diameter "D", is drilled in airport plate 10. This hole is preferably drilled from front surface 10a to a depth "L", of approximately four times the diameter "D", with a close tolerance on this depth dimension. A hole or bore 41, of slightly smaller diameter "d", is drilled on the same center line (C—C) from the base of counterbore 39 to the back surface 10b of plate 10, thereby forming a counterbored or stepped hole as shown on the left side of FIG. 3.

Counterbore 39 is preferably drilled with a numerically controlled drilling machine (not shown), capable of sensing when the tip of the drilling bit 43 first contacts surface 10a and determining the depth of the ensuing hole with great accuracy. This procedure inherently compensates for any variations in plate thickness or localized surface irregularities.

Through hole 41 can be cut with the same drilling machine fitted with a smaller diameter bit. Drilling both holes from the same side of the plate and with the same drilling machine simplifies the drilling process and maximizes the accuracy of the cuts. It would, of course, be possible to reverse the sequence of the drilling steps or to drill the holes from opposite sides of plate 10.

According to the present invention, the step formed at the base of counterbore 39, acts as a stop for a precision cut optical fiber 45, which is inserted in this hole. The optical fiber is typically made of glass or plastic and has a generally circular cross-section. Fiber 45 is "precision cut" in the sense that its length (axial dimension) is closely controlled. The fiber is fabricated so that its length equals the depth of counterbore 39 plus the desired protrusion of its output end beyond surface 10a. When inserted in counterbore 39, the input end of precision cut fiber 45 will rest on the step at the bottom of the counterbore, and the output end will protrude a desired distance beyond the exposed surface of the airfield plate (typically a distance on the order of the diameter of the fiber, e.g., 0.030").

It is evident that the preciseness of the protrusion of the fiber's output end depends upon the accuracy with which the counterbore is drilled and the fiber is cut. In the preferred embodiment, the depth of the counterbore and the length of the fiber are each controlled within about 0.002", thereby ensuring that the protrusion of the fiber end is within acceptable limits.

As an alternative to operating under such tight tolerances, a selection of fibers covering a range of lengths can be prepared. These fibers would be individually fitted in the counterbores and the resulting protrusion measured, until a fiber providing the desired protrusion was located. This trial and error process is analogous to that required by the prior art fiber mounting method; however, it would be much easier to accomplish since both fiber installation and protrusion measurement could be done from the front of the airport plate.

The output ends of the precision cut fibers can be angled, ground and/or polished to provide unidirectional light, omnidirectional light, or any other variation in directionality of the output light. A simple mechanical tool can be used to angularly orient those precision cut optical fibers 45a which simulate unidirectional lights. The tool comprises a small rectangular solid block 51 having one of its corners cut off at an angle which matches that formed at the output end of the precision cut optical fiber. A very thin layer of non-abrasive material 53, e.g., cork, can be placed on the beveled face of block 51. The block is first oriented with respect to a datum line, e.g., the center line of a model runway, and then the precision cut fiber 45a being aligned, is rotated, until its output face is oriented parallel to the beveled face of the block.

There is, of course, no need to angularly orient those precision cut optical fibers 45b which simulate omnidirectional lights.

The input end of each precision cut fiber is preferably cut perpendicularly to the longitudinal axis of the respective fiber and then ground and polished.

Optical fibers 47, extending through holes 41, optically couple the input ends of the precision cut fibers 45 to a collimated light source 49. Connecting fibers 47, which are of smaller diameter than the precision cut fibers 45, are inserted in holes 41 from the backside 10b of plate 10. Like the precision cut fibers, the connecting fibers are typically made of glass or plastic and have a generally circular cross-section.

Light source 49 may comprise any illumination system capable of producing collimated light; preferably, it consists of the unique illumination system disclosed in the above-mentioned Mecklenborg application. This illumination system employs a lamp, a condenser-relay, a fixed pupil, an adjustable iris diaphragm, and collimating lenses, arranged serially, to provide identical input cones of light to the connecting fibers. Increased efficiency, uniform brightness of the simulated lights, and control of said brightness without deleterious variation in uniformity and color of the output light, result from this arrangement. In addition, this specially designed optical system permits realistic changes in simulated light size as a function of a simulated range signal.

Figure 4C:
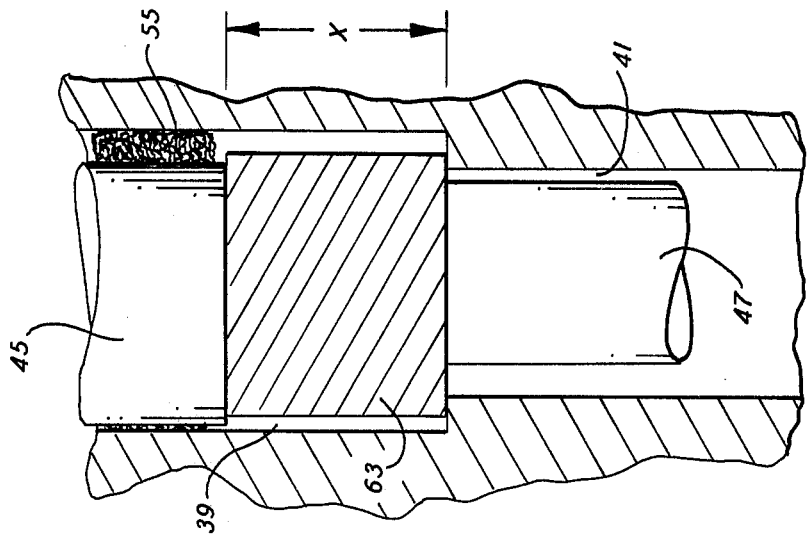
FIGS. 4B and 4C are enlarged detailed views of alternate constructions of the invention.
Figure 4B:
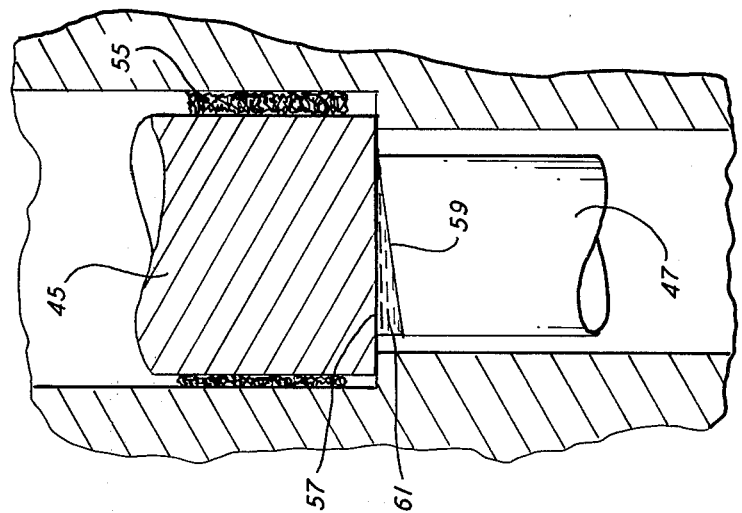
Figure 4A:
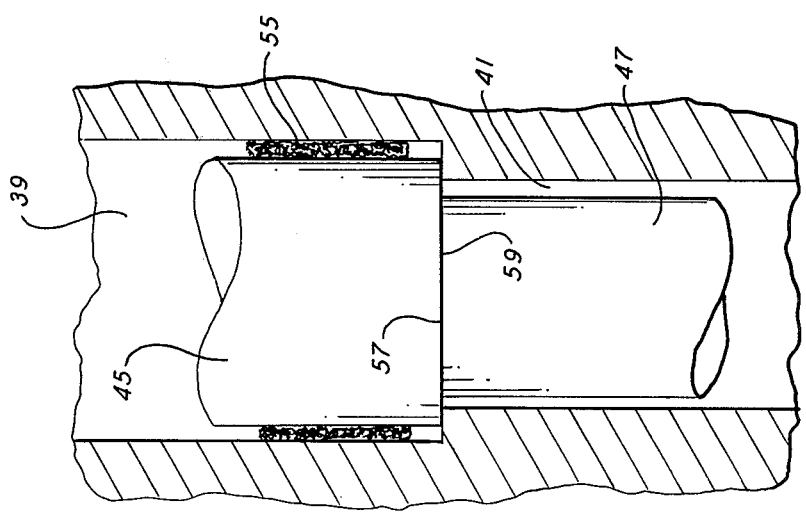
FIG. 4A is an enlarged detail of the encircled fiber interface of FIG. 3.

As shown in the enlarged detail of FIG. 4A, precision cut fiber 45 has a diameter slightly smaller than hole 39 but sufficiently larger than hole 41 to ensure that it is always circumferentially supported by the base of counterbore 39. Connecting fiber 47 has a diameter slightly smaller than hole 41. As an illustration, hole 39 might have a diameter of 0.0312 inches and hole 41 might have a diameter of 0.0215 inches; precision cut fiber 45 could have a diameter of 0.0292 inches and connecting fiber 47 could have a diameter of 0.0195 inches. These holes are drilled and the fibers fabricated with an accuracy on the order of 0.002".

In the ideal situation depicted in FIG. 4A, fibers 47 and 45 are coaxial. It should be noted, however, that the fibers may be laterally misaligned without any deleterious effects, since precision cut fiber 45 is so dimensioned that its input face 57 always covers the opening of hole 41.

An adhesive 55 can be applied around the periphery of precision cut fiber 45 to secure it within counterbore 39. Adhesive 55 might comprise a rubberized cement or a conventional optical bonding cement. The adhesive is designed to firmly secure the precision cut fiber within its respective counterbore. Thus precision cut fibers 45 can be mounted, oriented and secured within the counterbored holes in airport plate 10 at an early stage in the model fabrication process. The airport plate is shipped to the site of final assembly with the precision cut fibers already secured therein.

Connecting fibers 47 are simply spring loaded in holes 41 (i.e., maintained in said hole by the natural spring rate of the bent connecting fibers). The connecting fibers can thus be easily removed for separate transport to the site of final assembly, or, if damaged during operation, quickly replaced. The output face 59 of each connecting fiber 47, like the input face 57 of each precision cut fiber 45, is preferably cut perpendicularly to the longitudinal axis of the fiber and ground and polished to maximize light transmission.

To further ensure an efficient transfer of light between surface 59 and surface 57, a drop of silicon fluid 61 may be inserted at this interface, as shown in FIG. 4B. The index of refraction of the silicon fluid is chosen to match the index of the glass or plastic fibers, thus minimizing light loss across the transition.

In FIG. 4B, precision-cut fiber 45 is shown as a length of colored fiber. By employing an appropriately colored glass or plastic fiber, a permanently colored simulated light can be created. Instead of using a colored fiber, a precision-cut fiber with a dye coloring at its input end or output end could be employed. Alternatively, a color filter could be inserted between fiber 47 and precision-cut fiber 45.

The latter arrangment is shown in FIG. 4C. As illustrated therein, precision-cut fiber 45 is cut shorter by an amount "X". A colored element or filter disc 63, of length "X", is then inserted in hole 39 followed by the shorter precision-cut fiber. The disc 63 preferably has a diameter and length on the order of the diameter of fiber 45.

Although it would be possible to mount a filtering disc on the other side of the stop, or to color connecting fiber 47, it is preferable to incorporate the coloring element with the firmly secured precision-cut fiber. This arrangement, not only eliminates the need for a filter assembly at the light source, but also permits any connecting fiber to the inserted into cavity 41 during final assembly.

It should be noted that in FIG. 4C the fibers and filter disc are shown out of alignment. This lateral misalignment is insignificant since filter disc 63 and precision-cut fiber 45 are configured to always cover the opening of hole 41. If desired, silicon fluid may be sandwiched between the disc and fiber surfaces to maximize light transmission.

Figure 5:
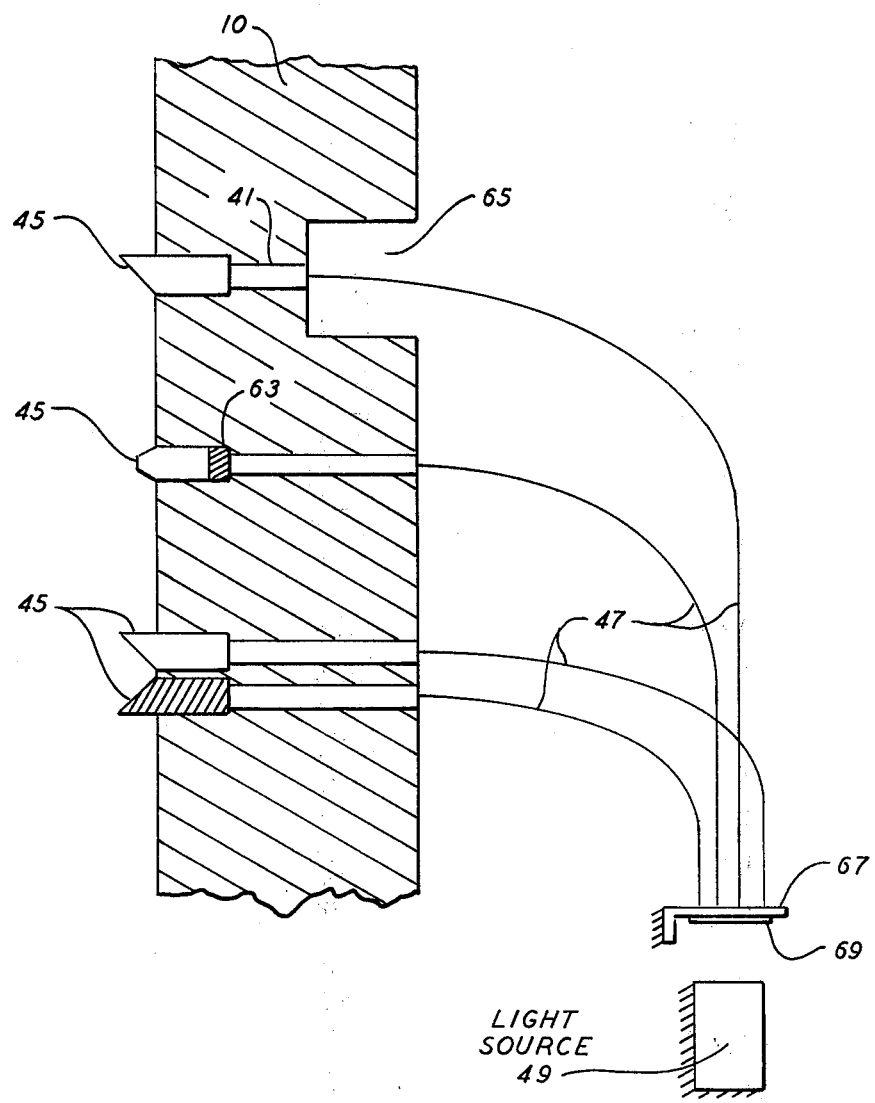
FIG. 5 is a cross-sectional view illustrating final assembly of the improved model of the invention.

FIG. 5 shows airport plate 10 at final assembly. Precision-cut fibers 45 are preinstalled in plate 10, as previously described. The plate is shipped with the precision-cut fibers firmly bonded in place but with all of the connecting fibers 47 removed. At final assembly, fibers 47 can be randomly inserted in holes 41. Since the color, height, and directionality of the simulated lights are determined by the precision-cut fibers, the matching of particular connecting fibers 47 with particular holes 41 is unnecessary.

As shown in FIG. 5, the input ends of connecting fibers 47 can be randomly inserted in apertures in a standard bracket 67. These input ends abut against a glass plate 69 secured, in a conventional manner, to bracket 67. The bending of each fiber 47 serves to maintain its input end in its respective aperture in bracket 67 and its output end in its respective hole 41 in plate 10. Should it become desirable to remove or replace a connecting fiber 47, this can easily be accomplished by simply removing the ends of the fiber from said apertures.

Should removal of a previously secured precision cut fiber 45 become necessary, the adhesive bond may be broken by applying suitable force to the input face of the fiber. This can be done by first removing fiber 47 from hole 41, and then applying the required bond destroying force with a pin having a cushioned tip, or other similar tool (not shown), inserted into cavity 41 from the backside of plate 10.

As depicted in FIG. 5, a recess 65 can be milled on the back surface of plate 10. This optional milling operation might simplify the drilling of hole 41 but at an increase in the cost of fabricating the airport plate.

The light source 49, shown in FIG. 5, supplies white, collimated light to the input ends of connecting fibers 47. If flashing strobe or color varying VASI lights are to be simulated, separate light sources with, for example, rotatable apertured plates or translatable filter means can be employed. Mechanisms suitable for these purposes are disclosed in the aforementioned Mecklenborg application.

The present invention exhibits a host of significant advantages over the prior art fiber mounting technique. It eliminates the need for the keying pin, the subplate, the precision fiber-pin subassembly procedure, and the lengthy final installation step of the old method. The precision-cut fibers of the instant invention can be installed in the airfield plate under better working conditions than presently required (i.e., with the plate oriented horizontally in the lab rather than oriented vertically in the model support structure.) Since the fibers which join the precision-cut fibers to the light source are not critical and need not be matched to particular holes, the final installation can be performed quickly and easily by other than a skilled lab technician. The present invention thus significantly reduces the complexity, cost, and labor involved in fabricating an airport plate having simulated lights.

Of course, the fiber mounting approach of the instant invention is applicable to a wide variety of other structures through which optical fibers extend.

Although the invention has been described in terms of a particular illustrative embodiment, it will be apparent to those skilled in the art that various modifications can be made without departing from the scope of the invention, as defined by the claims appended hereto.

What we claim is:

1. In display apparatus, the combination comprising:
   (a) plate means having a first surface exposed for viewing, a second surface opposite said first surface, a through hole extending between said first and second surfaces, and a counterbore coaxial with said through hole and contiguous with said first surface;
   (b) a first light conducting member having an input end supported within said counterbore, an output end which protrudes slightly beyond the first surface of said plate means and a length which ensures that said output end protrudes a predetermined distance beyond said first surface; and
   (c) means for illuminating the input end of said light conducting member.

2. The combination of claim 1, wherein said first light conducting member is an individual optical fiber and the output end of said fiber protrudes a predetermined distance, on the order of the fiber diameter beyond said first surface.

3. The combination of claim 2, wherein said illuminating means comprises a source of collimated light.

4. The combination of claim 3, further including a second optical fiber optically coupling the input end of said first light conducting member to said source of collimated light.

5. The combination of claim 4 further including means for securing said first light conducting member within said counterbore.

6. The combination of claim 5 further including light coloring means associated with said first light conducting member.

7. Apparatus for simulating, in reduced scale, a light at an aircraft landing site, comprising:
   a model board having a first surface exposed for viewing, a second surface opposite said first surface, a first bore extending into said model board from said first surface and terminating in a base at a predetermined depth within said model board, and a second smaller diameter bore extending from the base of said first bore to said second surface;

a first optical fiber secured within said first bore, said fiber having an input end which overlies said second bore and is circumferentially supported by the base of said first bore, said fiber having a length such that its output end protrudes a predetermined distance beyond the first surface of said model board, the output end of said fiber being designed to provide a desired directionality to light exiting from the fiber; and means for illuminating the input end of said fiber, whereby the output end of said first fiber realistically simulates a light at an aircraft landing site.

8. The apparatus of claim 7, wherein said first and second bores each have a generally cylindrical shape.

9. The apparatus of claim 8 wherein said first bore extends into said model board along a direction substantially perpendicular to said first surface.

10. The apparatus of claim 9 wherein said first and second bores are substantially coaxial.

11. The apparatus of claim 10 wherein said first optical fiber has a generally circular cross-section and a diameter smaller than the diameter of said first bore but larger than the diameter of the second bore.

12. The apparatus of claim 11 wherein the input end of said fiber is cut substantially perpendicular to the longitudinal axis of said fiber and is ground and polished.

13. The apparatus of claim 11 wherein said fiber has a diameter which ensures that the input end of said fiber always covers said second bore.

14. The apparatus of claim 11 wherein said first optical fiber is secured within said first bore by an adhesive applied around the periphery of said fiber.

15. The apparatus of claim 11 wherein the output end of the fiber is angled, ground and polished to provide unidirectional output light and the fiber is rotationally oriented so that said unidirectional light projects in a desired direction.

16. The apparatus of claim 7 further including a coloring element incorporated with said first optical fiber.

17. The apparatus of claim 16 wherein said coloring element comprises a dye coloring at an end of said fiber.

18. The apparatus of claim 16 wherein said coloring element comprises a color filter located between the base of the first bore and the input end of said fiber.

19. The apparatus of claim 16 wherein said optical fiber comprises a length of colored fiber.

20. The apparatus of claim 7 wherein said illumination means comprises:
a source of collimated light; and
a second optical fiber optically coupling said light source to the input end of said first fiber.

21. The apparatus of claim 20 wherein said second optical fiber has an output end which is spring-loaded in said second bore.

22. The apparatus of claim 21 further including means for minimizing light loss between the output end of said second fiber and the input end of said first fiber.

23. The apparatus of claim 22 wherein said means for minimizing light loss comprises silicon fluid sandwiched between the output end of said second fiber and the input end of said first fiber, said silicon fluid having an index of refraction matched to that of the optical fibers.

24. A method of constructing a simulated airfield light on a model board, comprising the steps of:
(a) providing a counterbored hole in the model board, said hole extending through said model board with the counterbore extending from a front surface of said model board to a base at an intermediate depth within said model board;
(b) mounting a first optical fiber, having an output end which provides a specified directionality to light exiting from the fiber, in the counterbore of said counterbored hole so that an input end of said fiber overlies said hole and is circumferentially supported by the base of said counterbore;
(c) coordinating the length of said first optical fiber with the depth of the counterbore so that the output end of said fiber protrudes a predetermined distance beyond the front surface of the model board; and
(d) providing means for illuminating the input end of said fiber.

25. The method of claim 24 wherein said step of providing a counterbored hole includes drilling said counterbore to a known depth; and
wherein said coordinating step comprises precision cutting of said first fiber to a length equal to said known depth plus said predetermined distance.

26. The method of claim 24 wherein said coordinating step comprises:
providing a selection of optical fibers of different lengths; and
selecting said first fiber by inserting various ones of said optical fibers in said counterbore and determining which one of said fibers provides the desired output end protrusion.

27. The method of claim 24 wherein the output end of said fiber is angled, ground and polished to provide unidirectional light; and
further including the step of employing a block having a beveled face to angularly orient said fiber.

28. The method of claim 24 further including the step of coloring the light exiting from said fiber with a coloring element associated with said fiber.

29. The method of claim 24 wherein said step of providing illumination means comprises:
providing a source of collimated light; and
optically coupling said source to said first optical fiber with a second optical fiber of smaller diameter.

30. The method of claim 29 further including the steps of:
securing said first optical fiber within said counterbore with adhesive;
inserting one end of said second optical fiber into said counterbored hole from the backside of the model board; and
spring-loading said second optical fiber to maintain said one end within said counterbored hole.

31. The method of claim 30, further including the steps of:
shipping the model board with said first optical fiber secured within said counterbore to a site of final assembly;
separately shipping said second optical fiber to said final assembly site; and
optically coupling said first fiber to the source of collimated light with said second fiber at the site of final assembly.

32. The method of claim 30, further including the steps of:
providing a plurality of such counterbored holes in said model board;
providing a plurality, equal in number to said plurality of counterbored holes, of optical fibers similar to said first optical fiber and securing respective ones of said plurality of fibers within respective counterbores of said counterbored holes;

shipping said model board, with said plurality of optical fibers secured therein, to a site of final assembly;

providing, at said final assembly site, a plurality, equal in number to said plurality of counterbored holes, of connecting fibers similar to said second optical fiber; and optically coupling the fiber in each counterbore of said model board to said collimated light source with a randomly selected one of said connecting fibers.

* * * * *